United States Patent
Matsuda

(10) Patent No.: US 8,977,949 B2
(45) Date of Patent: Mar. 10, 2015

(54) ELECTRONIC DOCUMENT EQUIVALENCE DETERMINATION SYSTEM AND EQUIVALENCE DETERMINATION METHOD

(75) Inventor: Katsushi Matsuda, Minato-ku (JP)

(73) Assignee: NEC Corporation, Tokyo (JP)

( * ) Notice: Subject to any disclaimer, the term of this patent is extended or adjusted under 35 U.S.C. 154(b) by 451 days.

(21) Appl. No.: 12/682,722

(22) PCT Filed: Oct. 10, 2008

(86) PCT No.: PCT/JP2008/068506
§ 371 (c)(1),
(2), (4) Date: Apr. 12, 2010

(87) PCT Pub. No.: WO2009/048149
PCT Pub. Date: Apr. 16, 2009

(65) Prior Publication Data
US 2010/0218080 A1    Aug. 26, 2010

(30) Foreign Application Priority Data

Oct. 11, 2007 (JP) ................. 2007-265499

(51) Int. Cl.
*G06F 17/00* (2006.01)
*G06F 17/30* (2006.01)
*G06F 17/22* (2006.01)

(52) U.S. Cl.
CPC ...... *G06F 17/30675* (2013.01); *G06F 17/2211* (2013.01)
USPC ........................................................ 715/209

(58) Field of Classification Search
CPC .................................................... G06F 17/30
USPC ........................................................ 715/209
See application file for complete search history.

(56) References Cited

U.S. PATENT DOCUMENTS 5,754,674 A * 5/1998 Ott et al. ................. 382/112
5,787,414 A 7/1998 Miike et al.
(Continued)

FOREIGN PATENT DOCUMENTS

JP  06-348758 A  12/1994
JP  07-225761 A   8/1995
(Continued)

OTHER PUBLICATIONS

G. Salton et al,. "A Vector Space Model for Automatic Indexing", Communication of the ACM, Nov. 1975, pp. 613-620, vol. 18, No. 11.
(Continued)

*Primary Examiner* — Kavita Padmanabhan
*Assistant Examiner* — Andrew McIntosh
(74) *Attorney, Agent, or Firm* — Sughrue Mion, PLLC

(57) ABSTRACT

An equivalence determination system (10) according to this invention includes a specifying means (11) and determination means (12). The specifying means (11) specifies parts of respective electronic documents in a document database that are rarely modified manually. The determination means (12) determines whether the parts specified by the specifying means (11) match each other between a plurality of electronic documents, and when determining that the parts match each other, specifies that these documents are a plurality of similar electronic documents. An electronic document which cites part or all of another electronic document and is slightly modified can be quickly specified in the document database.

10 Claims, 11 Drawing Sheets

(56) References Cited

U.S. PATENT DOCUMENTS

| | | | |
|---|---|---|---|
| 6,658,626 B1 * | 12/2003 | Aiken | 715/205 |
| 6,757,675 B2 * | 6/2004 | Aiken et al. | 1/1 |
| 2002/0078091 A1 * | 6/2002 | Vu et al. | 707/513 |
| 2002/0078098 A1 | 6/2002 | Shirai | |
| 2003/0007683 A1 * | 1/2003 | Wang et al. | 382/159 |
| 2004/0243601 A1 | 12/2004 | Toshima | |
| 2005/0188032 A1 | 8/2005 | Yamazaki et al. | |
| 2007/0027749 A1 * | 2/2007 | Peiro et al. | 705/14 |

FOREIGN PATENT DOCUMENTS

| | | |
|---|---|---|
| JP | 09-198409 A | 7/1997 |
| JP | 2002-183166 A | 6/2002 |
| JP | 2003-016092 A | 1/2003 |
| JP | 2004-334334 A | 11/2004 |
| JP | 2005-202590 A | 7/2005 |
| JP | 2005-222480 A | 8/2005 |
| JP | 2006-092344 A | 4/2006 |
| JP | 2006-318219 A | 11/2006 |
| JP | 2007-079616 A | 3/2007 |

OTHER PUBLICATIONS

Yukio Ohsawa et al., "KeyGraph: Automatic Indexing by Segmenting and Unifing Co-occurrence Graphs", IEICE Transactions, Feb. 1999, pp. 391-400, vol. J82-D-I, No. 2.

* cited by examiner

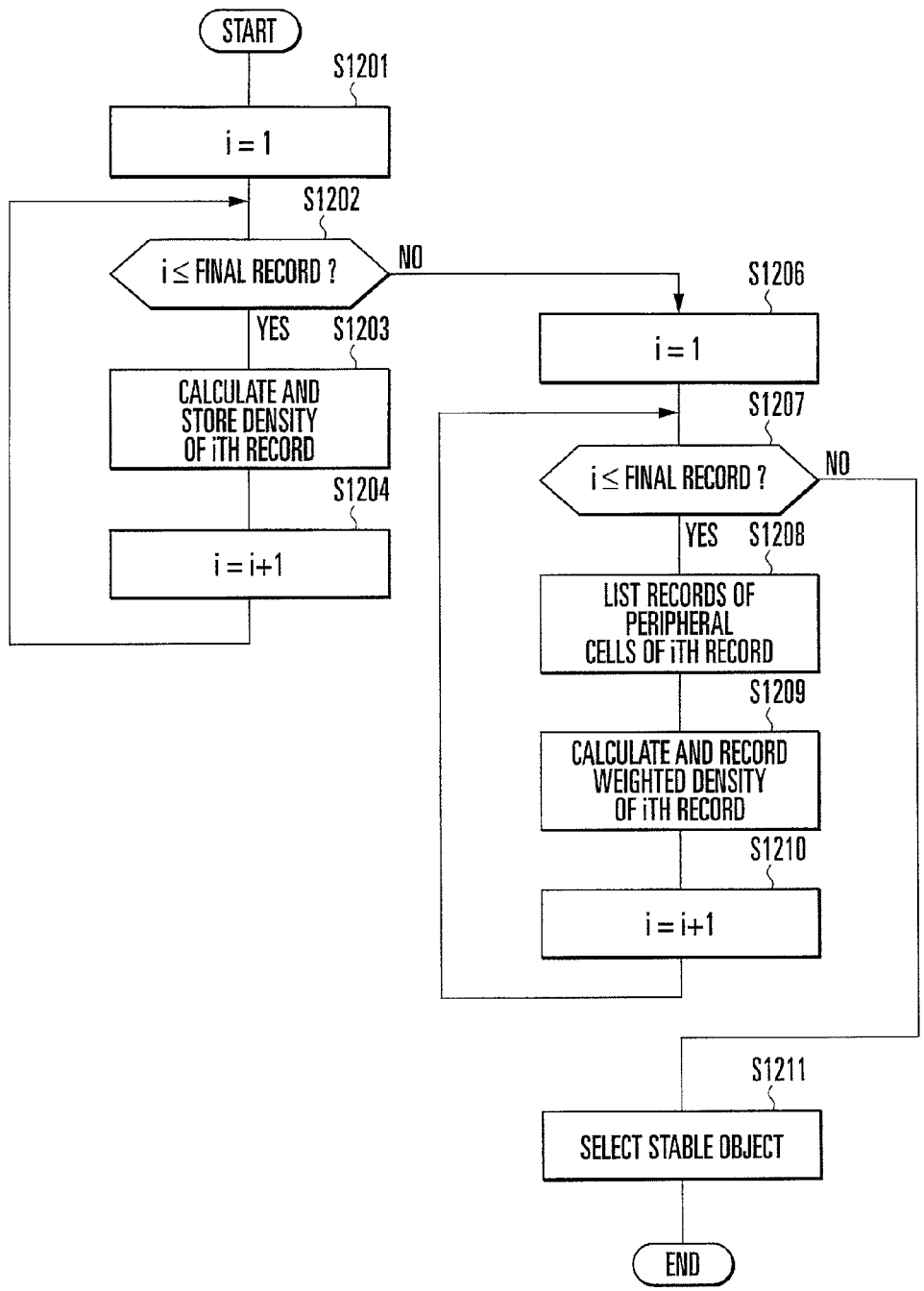
F I G. 7

ELECTRONIC DOCUMENT EQUIVALENCE DETERMINATION SYSTEM AND EQUIVALENCE DETERMINATION METHOD

TECHNICAL FIELD

The present invention relates to an electronic document equivalence determination system and equivalence determination method for quickly specifying, in a document database, an electronic document which cites part or all of another electronic document and is slightly modified.

BACKGROUND ART

There are various kinds of electronic documents in an organization, including a word processing document, presentation document, DTP document, CAD document, and spreadsheet document. When a database in which electronic documents are accumulated is searched for an electronic document that one wants to browse, it is not preferable in terms of search efficiency that many similar electronic documents appear as search results. In an organization, for example, an electronic document created by a given member is copied and modified by another member, a member himself saves an electronic document as another one upon every modification, or an electronic document created by a given member is distributed to many members by e-mail or the like. This generates identical or very similar electronic documents. Thus, identical or very similar electronic documents appear as search results. As a method of specifying identical or very similar electronic documents, there is known a conventional technique called similar document detection or very similar document detection.

The most popular similar document detection method is a vector space model in reference 1 ("A Vector Space Model for Automatic Indexing", Communications of the ACM, November, 1975, Vol. 18, No. 11, pp. 613-620). According to the method described in reference 1, a word appearing in a given document and its frequency are used as vectors. The similarity between documents is obtained based on the inner products of the vectors of the respective documents. However, the vector space model suffers the following problems. First, a larger number of extracted words increase the number of vectors and require a larger-capacity memory. Second, a larger number of extracted words prolong the time taken to calculate the inner product.

These problems can be solved to some extent by narrowing down words to be extracted. A word to be extracted after narrowing down is called a feature word. A variety of related techniques have been proposed for the feature word extraction method. The most famous method is tf*idf. tf*idf is a general feature word extraction method and a description thereof will be omitted. In another related technique, words which frequently co-occur in a document are used as feature words, as disclosed in, e.g., reference 2 (Japanese Patent Laid-Open No. 2005-222480) and reference 3 ("KeyGraph: Automatic Indexing by Segmenting and Unifing Co-occurrence Graphs", IEICE Transactions, February, 1999, Vol. J82-D-I, No. 2, pp. 391-400). Also, there are many related techniques which uses a compound word as a feature word, as disclosed in, e.g., reference 4 (Japanese Patent Laid-Open No. 2003-16092).

Reference 5 (Japanese Patent Laid-Open No. 9-198409) discloses another similar document search method. According to the method described in reference 5, words belonging to a specific part of speech are extracted from character strings in an electronic document. The order of occurrence of these words and the part of speech of them are recorded. Then, documents or sentences are compared to specify similar documents or similar sentences. A main purpose of the technique disclosed in reference 5 is to detect an illegal copy which violates the copyright law, so more strict similarity is determined than that in the vector space model.

Reference 6 (Japanese Patent Laid-Open No. 2006-92344) discloses still another similar document search method. According to the method described in reference 6, various kinds of electronic documents (e.g., a word processing document, presentation document, DTP document, and CAD document) are converted into images of the same format, and compared for each pixel, thereby making document equivalence determination and detecting a difference. The most significant feature of this technique is that equivalence determination can be made even for figures and images in addition to character strings.

DISCLOSURE OF INVENTION

Problems To Be Solved By The Invention

However, it is difficult for the foregoing related techniques called similar document detection or very similar document detection to specify identical or very similar documents among various electronic documents in an organization and remove identical or very similar documents from search results. The identical or very similar documents will be called equivalent documents.

The related techniques described above originally aim at only calculating the similarity between a given document and another one. It is computationally difficult to specify similar documents in a set of many documents. For example, assume the time taken to calculate the similarity between two documents based on the vector space model is 1 msec ($\frac{1}{1000}$ sec). Calculating all similarities between each two arbitrary documents in a document set requires $n*(n-1)/2$ calculations. When 1,000,000 documents are accumulated in the document set, it takes 15 years or more to calculate all the similarities.

In the related techniques except for one described in reference 6, it is hard to accurately specify only equivalent documents because of the following reason. An equivalent document is often created by changing a given word in a document at once or changing a phrase. A set of feature words is greatly changed or an especially important feature word is changed. As a result, the similarity decreases greatly.

That is, the techniques described in references 1 to 6 face a challenge to quickly specify equivalent documents and a challenge to accurately specify only equivalent documents.

It is therefore an exemplary object of the present invention to provide an electronic document equivalence determination system and equivalence determination method for quickly specifying, in a document database, an electronic document which cites part or all of another electronic document and is slightly modified.

Means Of Solution To The Problems

An equivalence determination system according to the present invention comprises specifying means for specifying parts of respective electronic documents in a set of electronic documents that are rarely modified manually, and determination means for determining whether the parts specified by the specifying means match each other between a plurality of electronic documents, and when determining that the parts match each other, specifying that the documents are a plurality of similar electronic documents.

An equivalence determination system according to the present invention comprises character string extraction means for extracting an electronic document from a database in which an electronic document is accumulated, and extracting all character strings from the electronic document, hash value calculation means for calculating hash values of all the character strings extracted by the character string extraction means, and registering identification information of corresponding electronic documents in a hash table, and determination means for determining, based on a collision between hash values, that the corresponding electronic documents are equivalent.

An equivalence determination method according to the present invention comprises the steps of specifying parts of respective electronic documents in a set of electronic documents that are rarely modified manually, and determining whether the specified parts match each other between a plurality of electronic documents, and when the parts are determined to match each other, specifying that the documents are a plurality of similar electronic documents.

Effect of the Invention

According to the present invention, an electronic document which cites part or all of another electronic document and is slightly modified can be quickly specified in a document database.

BRIEF DESCRIPTION OF DRAWINGS

FIG. 7 is a flowchart exemplifying processing by a stable object specifying unit;

BEST MODE FOR CARRYING OUT THE INVENTION

Figure 1:
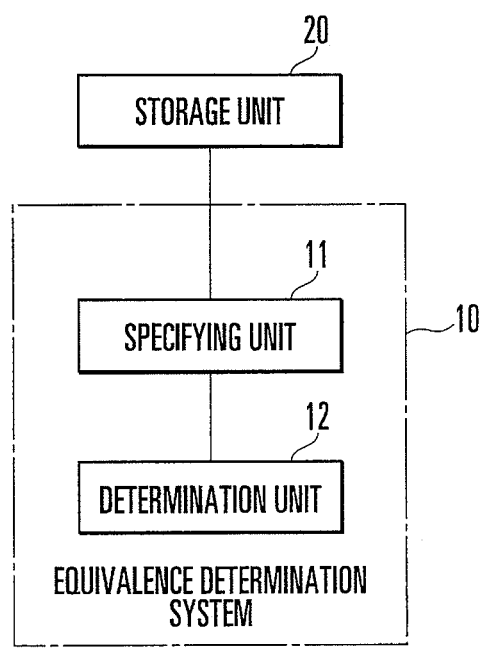
FIG. 1 is a block diagram exemplifying the minimum configuration of an equivalence determination system according to the present invention.

An outline of the present invention will be described with reference to the accompanying drawings. FIG. 1 is a block diagram exemplifying the minimum configuration of an equivalence determination system according to the present invention. An equivalence determination system 10 shown in FIG. 1 includes a specifying unit 11 and determination unit 12. The equivalence determination system 10 is connected to a storage unit 20 which stores a set of electronic documents.

The specifying unit 11 specifies parts of respective electronic documents in a set of electronic documents that are rarely modified manually.

The determination unit 12 determines whether the parts specified by the specifying unit 11 match each other, thereby specifying a plurality of similar electronic documents in the electronic document set.

With the arrangement shown in FIG. 1, a part rarely modified in an electronic document is specified. Documents which match each other at the specified part which is rarely modified are determined to be similar equivalent documents (to be also referred to as equivalent documents). An electronic document which cites part or all of another electronic document and is slightly modified can be specified quickly.

First Exemplary Embodiment

Figure 2:
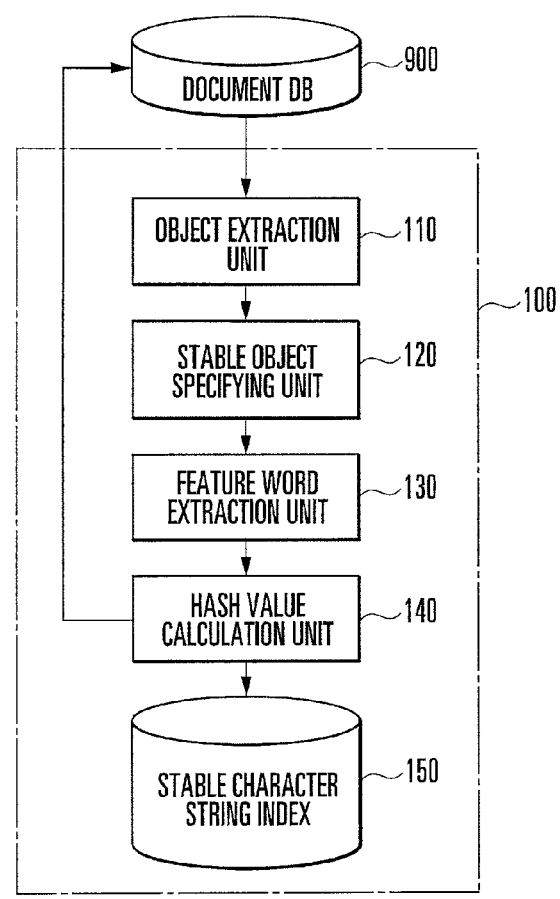
FIG. 2 is a block diagram exemplifying the configuration of an equivalence determination system according to the first exemplary embodiment.

The first exemplary embodiment of the present invention will be described with reference to the accompanying drawings. FIG. 2 is a block diagram exemplifying the configuration of an equivalence determination system according to the first exemplary embodiment. An equivalence determination system 100 shown in FIG. 2 includes an object extraction unit 110, stable object specifying unit 120, feature word extraction unit 130, hash value calculation unit 140, and stable character string index 150. The equivalence determination system 100 is connected to a document DB (DataBase) 900 in which electronic documents are accumulated.

The object extraction unit 110 extracts an object which forms an electronic document stored in the document DB 900.

The stable object specifying unit 120 selects a stable object which is rarely modified even when it is cited by a plurality of objects.

The feature word extraction unit 130 extracts at least one feature word serving as a feature character string from at least one stable object.

The hash value calculation unit 140 calculates a hash value from a feature word, and registers the ID (identification information) of a slide in the stable character string index 150 using the calculated hash value. When slides having the same hash value are detected, the hash value calculation unit 140 specifies these slides as equivalent ones. The hash value calculation unit 140 has the function of the determination unit 12 in FIG. 1.

The stable character string index 150 stores an index in which a pair of a hash value and electronic document is registered.

Note that the equivalence determination system 100 is implemented as, e.g., a computer program, and the stable character string index 150 is implemented by, e.g., a storage device. The program which implements the equivalence determination system 100 can be provided via a telecommunication line such as the Internet or provided by storing it in a machine readable recording medium such as an optical disk or magnetic disk.

The document DB 900 may reside in the same computer as that of the equivalence determination system 100 or in another computer via a network. The document DB 900 need not be one database, and may be distributed as a plurality of databases.

The operation in the first exemplary embodiment of the present invention will be explained with reference to FIG. 2.

Electronic documents created by members of a company or organization or copies of them are accumulated in the document DB 900. Electronic documents are desirably all electronic documents in a company or organization but may be some of them.

Although a method of collecting electronic documents is not particularly limited, it is desirable not to collect the same electronic document from the same save location by a plurality of number of times, so as not to additionally register it in the document DB 900. In other words, it is preferable not to register an electronic document in a given folder in a local PC as a different document in the document DB 900. In contrast, when a user copies the electronic document with a different file name in the same folder in the same local PC, or a user copies the electronic document with the same file name in a given folder in another local PC, the electronic document may be additionally registered as a different document in the document DB 900.

In the document DB 900, the ID, data body, file name, and the like of an electronic document are accumulated in the form of, e.g., a record in a database table. Depending on the type of electronic document, the electronic document may be made up of meaningful parts. In this case, uniquely identifiable IDs may be added to the respective partial documents to form a record for each partial document. Examples of the partial documents are chapters and sections in a word processing document, slides in a presentation document, and sheet documents in a spreadsheet document. The record of each electronic document or each partial document is assumed to have a field for recording the ID of an equivalent document. In the following description, a presentation document will be exemplified as an electronic document. However, the electronic document may be any of a word processing document, DTP document, CAD document, and spreadsheet document.

The operation of the equivalence determination system 100 will be described. The equivalence determination system 100 extracts electronic documents or partial documents accumulated in the document DB 900 one by one, and processes them. Processing for a partial document will be explained.

The equivalence determination system 100 can extract and process partial documents in an arbitrary order. The equivalence determination system 100 performs the following processing for all partial documents accumulated in the document DB 900, and ends it upon completion of processing all the partial documents.

When a new electronic document is added to the document DB 900 or an electronic document in the document DB 900 is updated during processing by the equivalence determination system 100, the equivalence determination system 100 performs processing even for the added/updated electronic document.

The object extraction unit 110 extracts, from the document DB 900 for each slide, objects serving as constituting elements contained in a slide which is a partial document of a presentation document. Objects in a presentation document are a text box and a variety of figures. Note that objects generally mean a text, figure, and equation in an electronic document.

The stable object specifying unit 120 specifies a separately designated number of objects (called stable objects) considered to be rarely modified even after they are cited from objects contained in a slide. In the following description, the designated number is, e.g., three. When the designated number of objects is "all", the stable object specifying unit 120 selects all objects. In this case, the equivalence determination system 100 according to the present invention specifies an equivalent document which is modified slightly, for example, changed in only decoration or object layout after citation. The user of the present invention suffices to properly set the designated number. The stable object specifying unit 120 notifies the feature word extraction unit 130 of three specified stable objects.

The feature word extraction unit 130 extracts a feature word from the text of the stable object specified by the stable object specifying unit 120. The feature word extraction unit 130 extracts a separately designated number of (at least one) feature words. The feature word may be an independent word or a partial character string divided based on the character type to be described in the first example. When the feature word is an independent word, the feature word extraction unit 130 decomposites a text by morphological analysis. If the designated number of objects is "all", the feature word extraction unit 130 extracts all independent words or all texts. In the subsequent description, the designated number is, e.g., two. When the number of objects specified by the stable object specifying unit 120 is three, the total number of feature words extracted by the feature word extraction unit 130 is 6 ($=3\times2$). Feature words desirably hold the order of occurrence in a text.

The hash value calculation unit 140 concatenates feature words for each slide, creating a text. The hash value calculation unit 140 calculates the hash value of the created text, and registers the ID of the slide in the stable character string index 150 using the calculated hash value.

If another slide has already been registered for the hash value of the slide to be registered, the hash value calculation unit 140 registers the slide ID of the slide during processing and that of the registered slide in the records of the partner slides in the document DB 900. More specifically, when the ID of the slide during processing is S0030 and that of the registered slide is S0015, S0015 is added to the equivalent document field of the record of S0030 in the document DB 900, and S0030 is added to the equivalent document field of the record of S0015. When slides having the same hash value are detected, the hash value calculation unit 140 specifies them as equivalent slides.

When no other slide has been registered for the hash value of the slide to be registered, the hash value calculation unit 140 directly registers the target slide ID in the stable character string index 150. After the equivalence determination system 100 processes all partial documents, the processing ends.

The effect of the first exemplary embodiment will be explained. According to the first exemplary embodiment, an electronic document which cites part or all of another electronic document and is slightly modified can be quickly specified in a document database. This is because a part rarely modified in an electronic document is specified, a feature word contained in the specified part is registered as a hash value, and equivalent documents are specified based on clash (collision) of the hash value.

If a predetermined number of hash values clash (collide) among the hash values of respective feature words, the hash value calculation unit 140 may determine that corresponding electronic documents are equivalent.

The operation in the first exemplary embodiment of the present invention will be described using examples. The first example will be explained with reference to FIG. 2.

A presentation document will be exemplified as an electronic document accumulated in the document DB 900. Note that the electronic document is arbitrary as long as it is used in a company or organization. In addition to a presentation document, a word processing document, DTP document, CAD document, and spreadsheet document are available.

Figure 3:
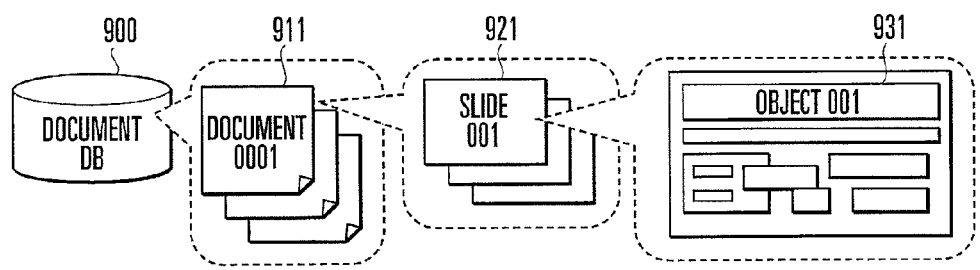
FIG. 3 is an explanatory view exemplifying the structure of a presentation document accumulated in a document DB.

FIG. 3 is an explanatory view exemplifying the structure of a presentation document accumulated in the document DB 900. More specifically, an ID is assigned to each electronic document (e.g., a document 911), and an ID is also assigned to each slide contained in the document (e.g., a slide 921). Each slide is formed from components called objects (e.g., an object 931).

In the first example, the equivalence determination system 100 determines the equivalence not between electronic documents but between slides. The equivalence between electronic documents can be easily determined when all slides are equivalent or slides within a given range are equivalent. For an electronic document formed from one slide, each electronic document is synonymous with each slide.

Figure 4:
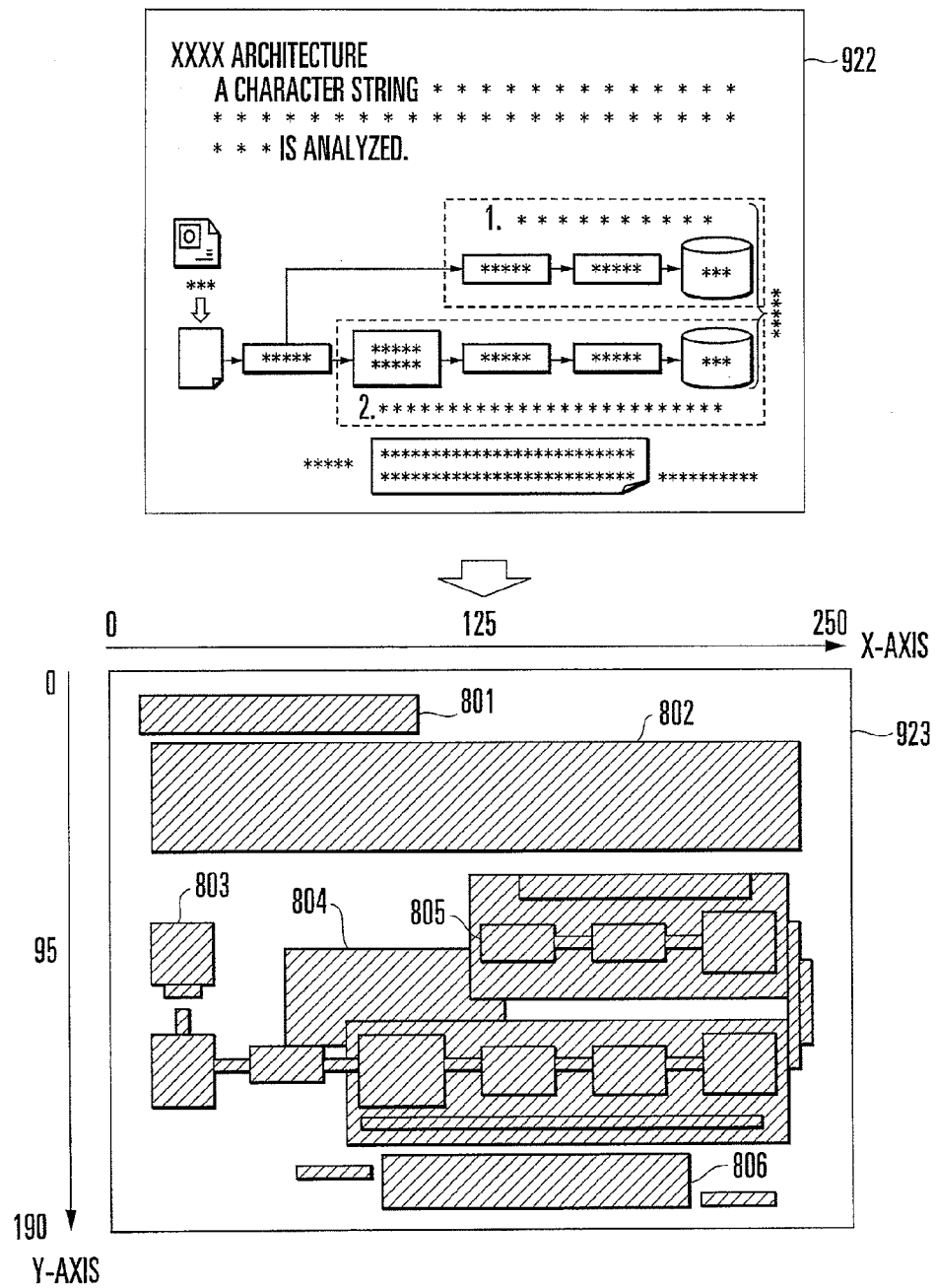
FIG. 4 is an explanatory view showing the relationship between the slide and the object.

The object extraction unit 110 extracts an object from each slide of a document stored in the document DB 900. FIG. 4 is an explanatory view showing the relationship between the slide and the object. A slide 922 is an example of an actual slide. A slide 923 is an example of a slide in which constituting components (objects) of the slide 922 are indicated by hatched rectangles.

For example, the title part of the slide 922 is an object 801 in the slide 923. In general, the object includes information on the coordinates of the start and end points, the type and attribute (e.g., background color and rotation angle) of the object, a character string contained in the object, and font, size, and color of the character string. This example uses only the coordinates of the start and end points of an object, a character string, and various decorations (e.g., color, underline, and bold face). Although not described in this example, it is also possible to multiply the decoration count (to be described later) by a weight or add a weight to it in accordance with the type of object. For descriptive convenience, the coordinate system shown in FIG. 4 is employed.

Figures 5, 6:
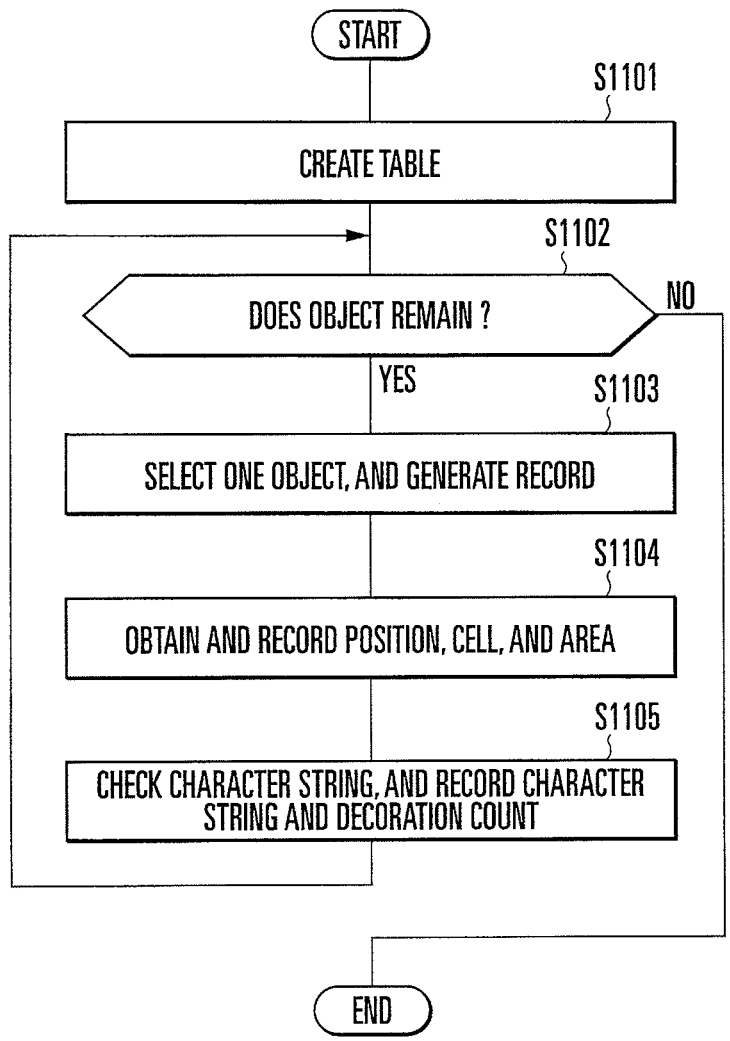
FIG. 5 is a flowchart exemplifying processing by an object extraction unit.
FIG. 6 is an explanatory view exemplifying division of a slide into unit squares.

FIG. 5 is a flowchart exemplifying processing by the object extraction unit 110. First, the object extraction unit 110 creates a table for recording extracted objects (step S1101). Table 1 is an example of the table created by the object extraction unit 110. Columns (fields) in Table 1 include pieces of information on the object ID, position, cell, area, character string, decoration count, density, and weighted density. Each row (record) includes information of each object.

Then, the object extraction unit 110 obtains the position, cell, and area of the object based on the coordinates of the start and end points, and records them in corresponding fields of the record (step S1104). The position may be, for example, the coordinates of the start point itself or the barycenter of the object. This example uses the barycenter. The area can be easily calculated from the coordinates of the start and end points. The cell is the number of a region where the object is positioned when the slide is divided into unit squares.

FIG. 6 is an explanatory view exemplifying division of a slide into unit squares. In the example of FIG. 6, the slide is divided into 50×50 unit squares. This example adopts 50×50. Assuming that the position of the object 801 in the slide 923 in FIG. 4 is (x,y)=(55,17), the cell is 2A.

The object extraction unit 110 extracts a character string contained in the object and counts decorations (step S1105). For an object containing no character string, the character string field is kept blank, and "0" is set in the decoration count field or this field is also kept blank. In this example, "0" is set in the decoration count field (corresponding to a record R803 in Table 1). By this processing, the object extraction unit 110 creates an object table as represented by Table 1.

The stable object specifying unit 120 calculates the density of each object using data of the table created by the object extraction unit 110. More specifically, the stable object specifying unit 120 calculates the density of each object based on the area of the object, and the amount of character string and decoration information contained in the object. The density is an index indicating the improbability of modifying or moving an object. The density takes a real number of 0 or more. A larger numerical value means a higher density.

FIG. 7 is a flowchart exemplifying processing by the stable object specifying unit 120. Processes in steps S1201, S1202, and S1204 form loop processing for sequentially processing respective records in the table. In step S1201, the stable object specifying unit 120 sets i=1. i is the number of an object (record). The stable object specifying unit 120 determines whether i is equal to or smaller than the final record number (step S1202).

If i is equal to or smaller than the final record number (YES), the stable object specifying unit 120 calculates the density of the ith record, and records it in a corresponding

TABLE 1

| Object ID | Position | Cell | Area | Character String | Decoration Count | Density | Weighted Density |
|---|---|---|---|---|---|---|---|
| R801 - D0001-S001-O001 | (55, 17) | 2A | 1300 | citation analysis . . . | 0 | | |
| R802 - D0001-S001-O002 | (125, 47) | 3A | 8800 | character string is modified . . . | 33 | | |
| R803 - D0001-S001-O003 . . . | (24, 100) | 1C | 396 | | 0 | | |
| R805 - D0001-S001-O008 | (130, 95) | 3B | 336 | character string extraction | 0 | | |
| R806 - D0001-S001-O027 . . . | (152, 160) | 4D | 2070 | 13c92be63f3 . . . | 0 | | |

The object extraction unit 110 checks whether an unprocessed object remains in the slide (step S1102). If an unprocessed object remains (YES), the object extraction unit 110 shifts to step S1103. If all objects have been processed (NO), the object extraction unit 110 ends the processing.

In step S1103, the object extraction unit 110 selects one unprocessed object and generates a record.

field of the record in the table (step S1203). In step S1204, the stable object specifying unit 120 sets i=i+1, and makes the determination in step S1202 for the next object.

A variety of methods are conceivable as the density calculation method in step S1203. Any calculation method is usable as long as the numerical value becomes large for an apparently dense object in a slide. This example employs a calculation described by equation (1) given below. mi is the density of an object i. In is the length of the object i. The applied calculation expression changes between a case in which no character is contained and a case in which a character is contained. For an object containing no character, i.e., no character string, the density is 1. For an object containing one or more characters, the density is calculated by multiplying the sum of the length of a character string and the number of decorations (decoration count: di) used in the character string by a constant C, and dividing the product by an area Si.

[Mathematical 1]

$$m_i \begin{cases} \dfrac{C \times (l_i + d_i)}{S_i} & (l_i > 0) \\ 1 & (l_i = 0) \end{cases} \quad (1)$$

In this example, the constant C is 100, but it suffices to give a constant balanced with the density "1" for an object containing no character. The decoration count is the number of characters to which any decoration is added in the character string. For example, when there is a character string "similar documents are specified based on the vector space model and used for search" and the part "vector space model" is colored, the decoration count is 16. (In Japanese, "For example, when there is a character string "ベクトル 空間モデルによって類似文書を 特定し、検索で 用いる" and the part "ベクトル空間 モデル" is colored, the decoration count is 9.") Various kinds of decorations are conceivable, and some or all of them may be used. For example, the font size may also be included in the decoration count.

Processing when NO in step S1202, i.e., the densities of all objects have been calculated will be explained.

Table 2 exemplifies registration of a table which records objects after the end of calculating the densities of all objects. The li and di values, i.e., character string length and decoration count in each record are described in the form of li+di.

ing the density calculated in step S1203 based on the relationship with peripheral objects.

First, in step S1208, the stable object specifying unit 120 extracts the cell value of the ith object and lists cells around the cell of the ith object. More specifically, in the cell division example shown in FIG. 6, when the cell value of a given object is 3B, its peripheral cells are 2A, 3A, 4A, 2B, 3B, 4B, 2C, 3C, and 4C. The peripheral cells are assumed to include the target cell 3B. Cell fields in the table are scanned to list objects matching these peripheral cells. At this time, the ith object is excluded.

Then, in step S1209, the stable object specifying unit 120 selects objects having a distance D or smaller from the object i among the objects listed in step S1208. The stable object specifying unit 120 calculates a weighted density Mi of the object i based on distances from the respective selected objects and their densities. For example, the stable object specifying unit 120 calculates the weighted density Mi by adding sum value of inverse proportion to each distance to peripheral objects to the density of the object. In step S1210, the stable object specifying unit 120 sets i=i+1, and makes the determination in step S1207 for the next object.

Equation (2) below is an example of the weighted density calculation expression in step S1209. The second term of equation (2) resembles the law of universal gravitation. The gravitations between the object i and all remaining objects may be obtained. However, it takes a long calculation time to solve equation (2) for all objects. Thus, the calculation targets only objects having the distance D or smaller. In this example, D=50.

[Mathematical 2]

$$M_i = m_i + \sum_j g \frac{m_i m_j}{r_{ij}^2} \quad (r_{ij} < D) \quad (2)$$

TABLE 2

| | Object ID | Position | Cell | Area | Character String | Decoration Count | Density | Weighted Density |
|---|---|---|---|---|---|---|---|---|
| R801 - | D0001-S001-O001 | (55, 17) | 2A | 1300 | citation analysis . . . | 0 | 0.85 | 11 + 0 |
| R802 - | D0001-S001-O002 | (125, 47) | 3A | 8800 | character string is modified . . . | 33 | 1.68 | 115 + 33 |
| R803 - | D0001-S001-O003 | (24, 100) | 1C | 396 | | 0 | 1.00 | |
| R805 - | D0001-S001-O008 | (130, 95) | 3B | 336 | character string extraction | 0 | 1.49 | 5 + 0 |
| R806 - | D0001-S001-O027 | (152, 160) | 4D | 2070 | 13c92be63f3 . . . | 0 | 9.13 | 189 + 0 |

Subsequent processes in steps S1206, S1207, and S1210 form loop processing for sequentially processing respective records in the table. In step S1206, the stable object specifying unit 120 sets i=1. The stable object specifying unit 120 determines whether is equal to or smaller than the final record number (step S1207).

If i is equal to or smaller than the final record number (YES), the stable object specifying unit 120 obtains a weighted density in steps S1208 and S1209 by further chang- The peripheral cells listed in step S1208 are used to quickly specify objects having the distance D or smaller. That is, objects within the radius of 50 always fall in the peripheral cells. However, some objects have a distance longer than the distance D, so the distances of all objects within the peripheral cells from the object i are attained. In this example, the constant g is 10, but it suffices to give a constant balanced in gravitation with mi.

The stable object specifying unit 120 records the calculated weighted density Mi in the table. Table 3 exemplifies registration of a table which records objects when NO in step S1207, i.e., after the end of calculating the weighted densities of all objects.

TABLE 3

| | Object ID | Position | Cell | Area | Character String | Decoration Count | Density | Weighted Density |
|---|---|---|---|---|---|---|---|---|
| R801 - | D0001-S001-O001 | (55, 17) | 2A | 1300 | citation analysis . . . | 0 | 0.85 | 1.04 |
| R802 - | D0001-S001-O002 | (125, 47) | 3A | 8800 | character string is modified . . . | 33 | 1.68 | 1.87 |
| R803 - | D0001-S001-O003 | (24, 100) | 1C | 396 | | 0 | 1.00 | 1.22 |
| . . . | | | | | | | | |
| R805 - | D0001-S001-O008 | (130, 95) | 3B | 336 | character string extraction | 0 | 1.49 | 2.63 |
| . . . | | | | | | | | |
| R806 - | D0001-S001-O027 | (152, 160) | 4D | 2070 | 13c92be63f3 . . . | 0 | 9.13 | 15.11 |
| . . . | | | | | | | | |

Finally in step S1211, the stable object specifying unit 120 selects a stable object from all objects. The number of selected stable objects may be one or arbitrary n. For example, for n=3, the stable object specifying unit 120 selects three objects having high weighted densities. Accordingly, the stable object specifying unit 120 ends the processing.

The feature word extraction unit 130 extracts a feature word from the character string of the stable object. The feature word extraction unit 130 may adopt an existing method. In this case, extraction of a feature word based on the character code set will be exemplified.

Figure 8:
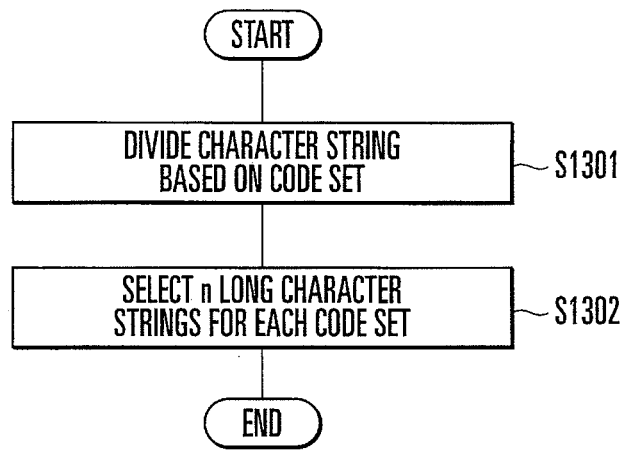
FIG. 8 is a flowchart exemplifying processing by a feature word extraction unit.

FIG. 8 is a flowchart exemplifying processing by the feature word extraction unit 130. The feature word extraction unit 130 divides a character string based on the code set (step S1301). The code set is a numerical value of 1 to 4 bytes that is uniquely determined when a computer expresses a character. Codes are successive depending on the character type. The character type includes 1-byte alphabetic characters, 1-byte numeric characters, 1-byte mark character, multibyte alphabetic characters, multibyte hiragana characters, multibyte numeric characters, multibyte mark characters, and multibyte kanji characters.

The feature word extraction unit 130 scans a character string from the beginning, and divides it at a portion where the character type changes. For example, a character string "文字列をコード区分で分割する (S1301)" is divided into "文字列", "を", "コード", "区分", "で", "分割", "する", "(", "S", "1301", and")". (In English, "For example, a character string "a character string is divided based on the code set (S1301)" is divided into "a character string is divided based on the code set", "(", "S", "1301", and")".") If alphabetic characters and numeric characters are not discriminated, "S" and "1301" are not divided and "S1301" remains. The division method suffices to be changed depending on the nature of electronic documents.

The feature word extraction unit 130 selects n long character strings for each code set (step S1302). For example, for n=2, ""文字列(character string)" and "区分(set)" or "分割(divided)" are selected from the code set of multibyte kanji characters, "コード (code)" is selected from the set of multibyte katakana characters, and "1301" is selected from the set of multibyte numeric characters. If the number of character strings is smaller than n, it suffices to select a smaller number of character strings. It is also possible not to select the hiragana and mark code sets as stop words. In this way, a feature word is extracted from a character string.

At this time, the order of occurrence needs to be saved. When the stable object specifying unit 120 specifies two or more stable objects, the feature word extraction unit 130 repeats the above-described processing by the number of stable objects. The stable object specifying unit 120 saves the order of specified stable objects.

The hash value calculation unit 140 calculates a hash value using, as a key, a set of feature words extracted by the feature word extraction unit 130. The hash value calculation unit 140 registers the slide ID in the stable character string index 150 serving as a hash table. If slides having the same hash value are detected, they are specified as equivalent slides.

Figure 9:
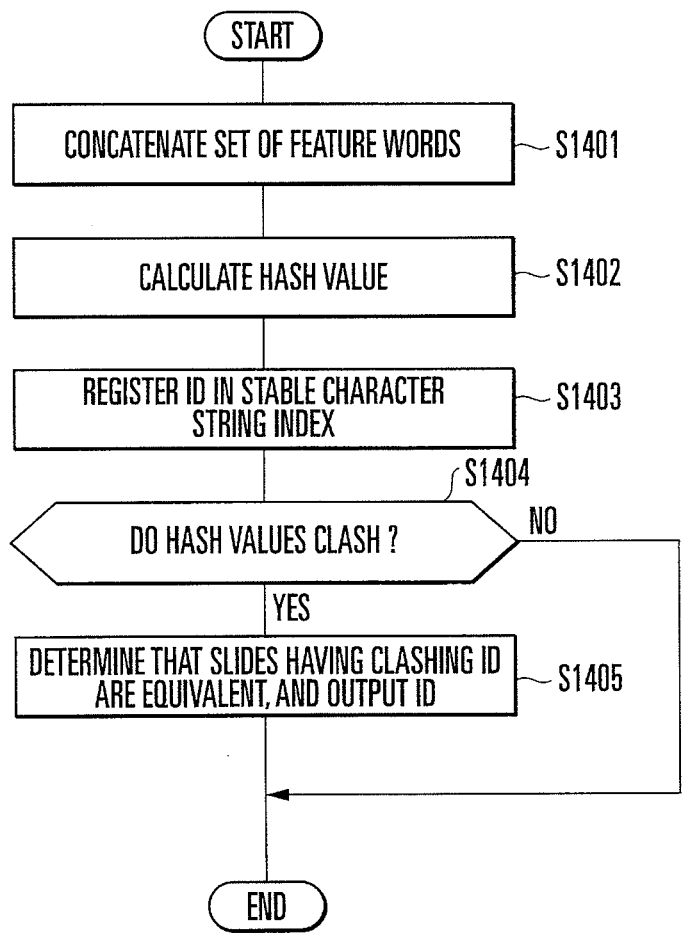
FIG. 9 is a flowchart exemplifying processing by a hash value calculation unit.

FIG. 9 is a flowchart exemplifying processing by the hash value calculation unit 140. First, the hash value calculation unit 140 concatenates a set of feature words extracted by the feature word extraction unit 130 (step S1401). For example, when a set of feature words is {NEC, feature word extraction, architecture} (in Japanese, {NEC, 特徴語抽出, アーキテクチャ}), the hash value calculation unit 140 creates a character string "NECfeaturewordextractionarchitecture" (in Japanese, "NEC 特徴語抽出アーキテクチャ").

Then, the hash value calculation unit 140 calculates a hash value using this character string as a key (step S1402). The hash calculation may adopt any method such as MD5. For example, the hash value of the character string "NECfeaturewordextractionarchitecture" obtained by any hash calculation is assumed to be "d11c802f4a2a9931bb7f2351ef2d397c".

Figure 10:
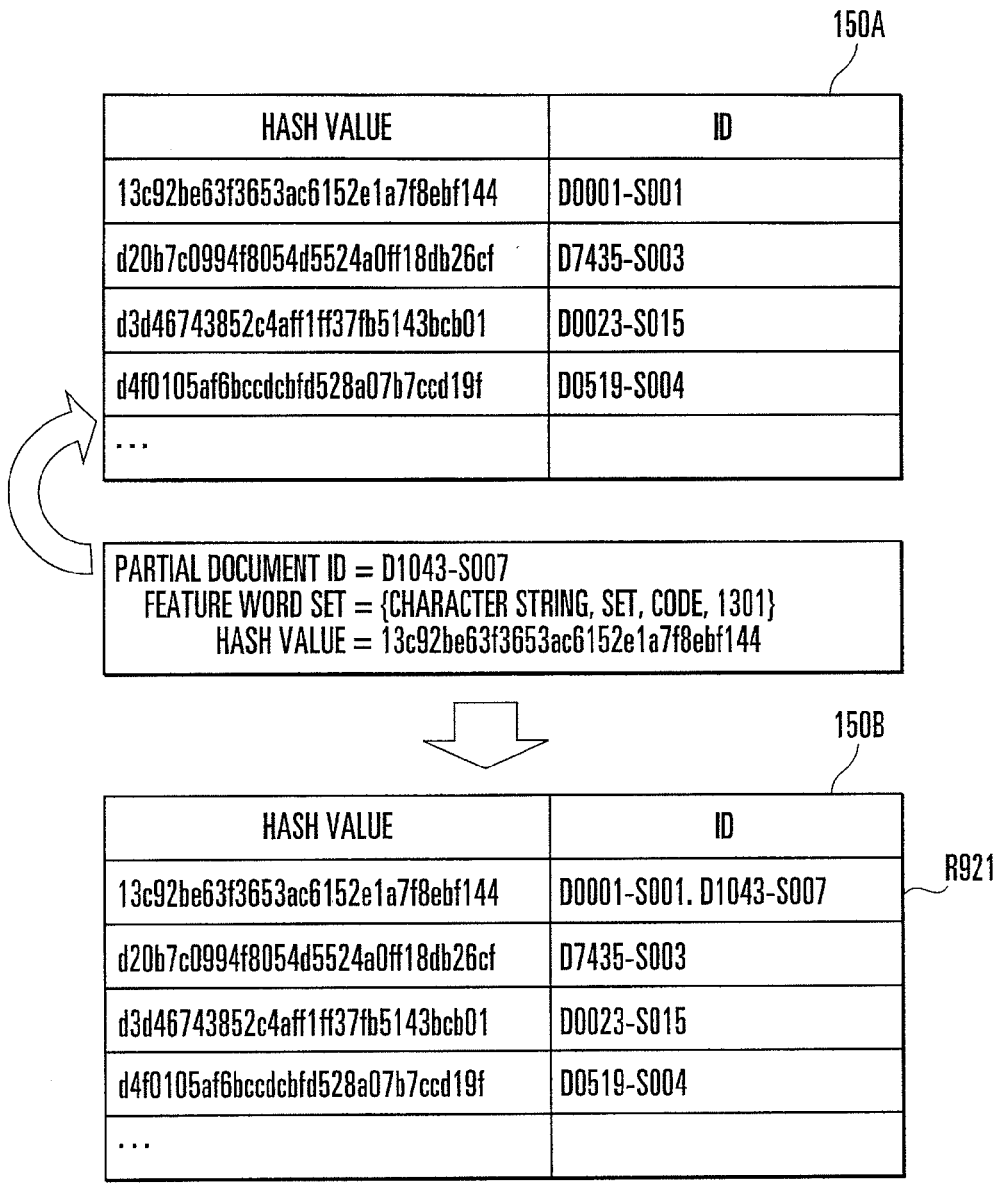
FIG. 10 is an explanatory view exemplifying registration of a stable character string index.

Assume that the stable character string index 150 is now in the state of a stable character string index 150A shown in FIG. 10. FIG. 10 is an explanatory view exemplifying registration of the stable character string index 150. Since the foregoing hash value does not exist in the stable character string index 150A, the hash value calculation unit 140 newly adds a record to the stable character string index 150. At this time, the hash value calculation unit 140 registers a slide ID having the above-described feature words and hash value (step S1403). In registration, the hash value calculation unit 140 checks whether hash values clash (step S1404).

In this example, hash values do not clash (NO), so the process ends. If hash values clash (YES), the hash value calculation unit 140 shifts to step S1405.

In step S1405, the hash value calculation unit 140 determines that slides having slide IDs which clash are equivalent, and outputs accordingly. In this example, the slide ID of one of equivalent slides is added to the row of the other slide in the document DB 900.

This will be explained using the example shown in FIG. 10. Assume that the ID of a slide having feature words {character string, set, code, 1301} (in Japanese, {文字列, 区分, コード, 1301}) is D1043-S007. The hash value calculation unit 140 creates a character string "characterstringsetcode1301" (in Japanese, "文字列 区分コード 1301") in step S1401, and obtains a hash value "13c92be63f3653ac6152e1a7f8ebf144" in step S1402.

The obtained hash value already exists in the stable character string index 150A shown in FIG. 10. Hence, the hash value calculation unit 140 registers the slide ID in correspondence with the hash value which has already been registered in the stable character string index 150 (step S1403). FIG. 10 shows a stable character string index 150B registered in this fashion. Two slide IDs are registered in a row R921 in the stable character string index 150B. If two or more slide IDs are registered as in this case (YES in step S1404), these slides are specified as equivalent slides (step S1405). The hash value calculation unit 140 executes this processing every time the feature word extraction unit 130 sends a feature word and slide ID. For each of slides D0001-S001 and D1043-S007 accumulated in the document DB 900, the slide ID of the other equivalent slide is recorded.

The second example in the first exemplary embodiment will be described. Similar to the first example, the second example will be explained with reference to FIG. 1. In the second example, as well as the first example, a presentation document will be exemplified. The second example is different from the first example in only the processing of the hash value calculation unit 140, and a description of the remaining part will not be repeated.

In the second example, the hash value calculation unit 140 calculates a hash value using a set of feature words as a key for each pair of a stable object specified by the stable object specifying unit 120 and a feature word set extracted by the feature word extraction unit 130. The hash value calculation unit 140 registers a slide ID in the stable character string index 150 serving as a hash table. The hash value calculation unit 140 lists slide IDs having the same hash value for each stable object, and specifies, as equivalent slides, slides whose slide IDs clash a separately designated number of times. More specifically, when two slide IDs are registered together for a plurality of hash values, if the number of times both these slide IDs are registered is equal to or larger than a predetermined number, it is determined that slides indicated by the two slide IDs are equivalent.

Figure 11:
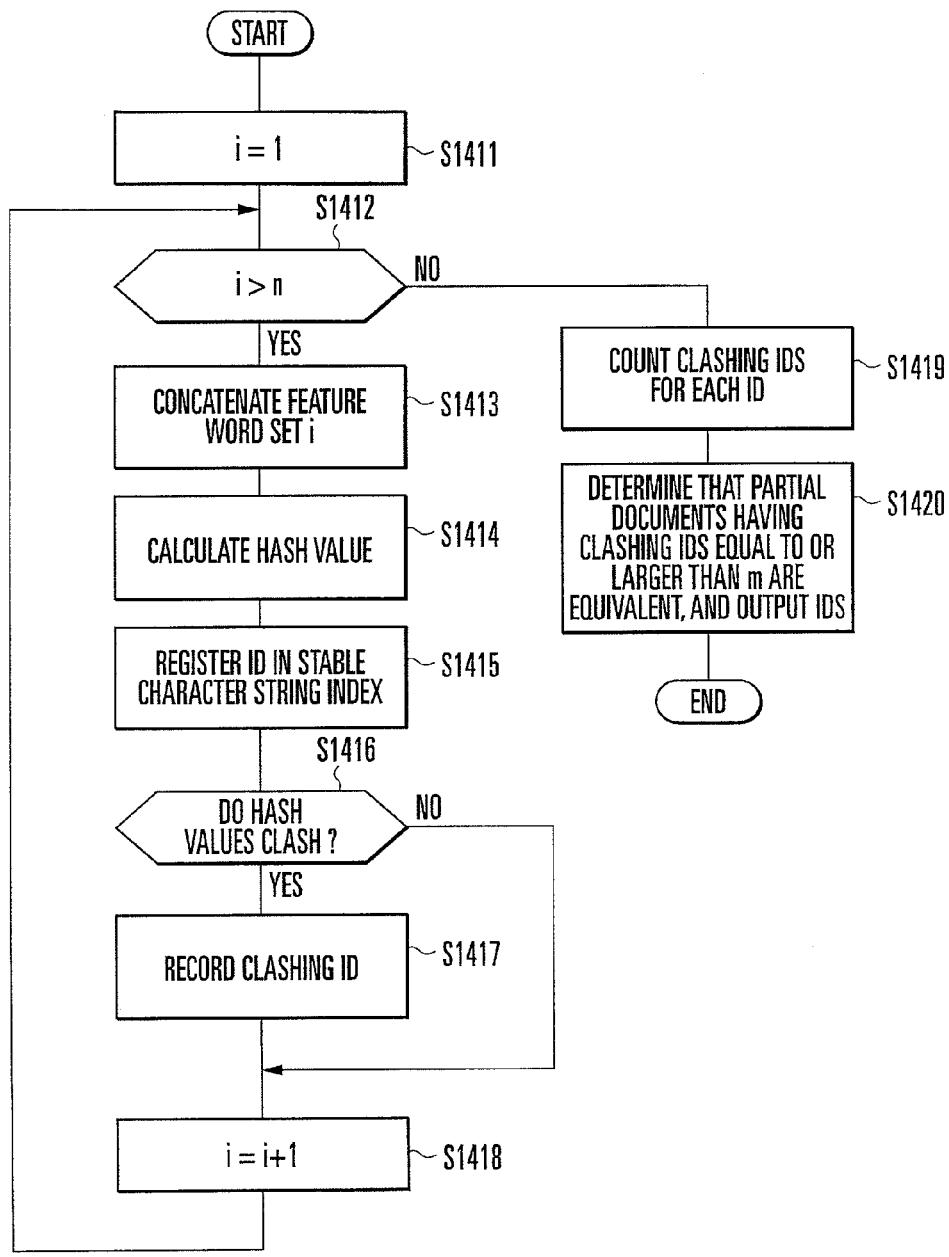
FIG. 11 is a flowchart exemplifying processing by the hash value calculation unit.

FIG. 11 is a flowchart exemplifying processing by the hash value calculation unit 140. In the flowchart, symbol "n" denotes the number of stable objects specified by the stable object specifying unit 120, and symbol "m" denotes a number used to determine that slides are equivalent.

Processes in steps S1411, 51412, and S1418 form loop processing for sequentially processing stable objects. When the number of stable objects is, e.g., three, the loop processing is executed three times. In step S1411, the hash value calculation unit 140 sets i=1. The hash value calculation unit 140 determines whether i is equal to or smaller than the number of stable objects (step S1412).

In the first example, the feature word extraction unit 130 extracts feature word sets for respective stable objects specified by the stable object specifying unit 120, and concatenates all the feature words. In the second example, the hash value calculation unit 140 concatenates feature words within only the feature word set of each stable object (step S1413). For example, when a set of feature words for a given stable object is {information extraction, algorithm} (in Japanese, {情報抽出, アルゴリズム}), the hash value calculation unit 140 creates a character string "informationextractionalgorithm" (in Japanese, "情報抽出アルゴリズム").

Then, the hash value calculation unit 140 calculates a hash value using the character string of the concatenated feature words as a key (step S1414). The hash calculation may adopt any method. For example, assume the hash value of the character string "informationextractionalgorithm" obtained by any hash calculation is "13c92be6".

Figure 12:
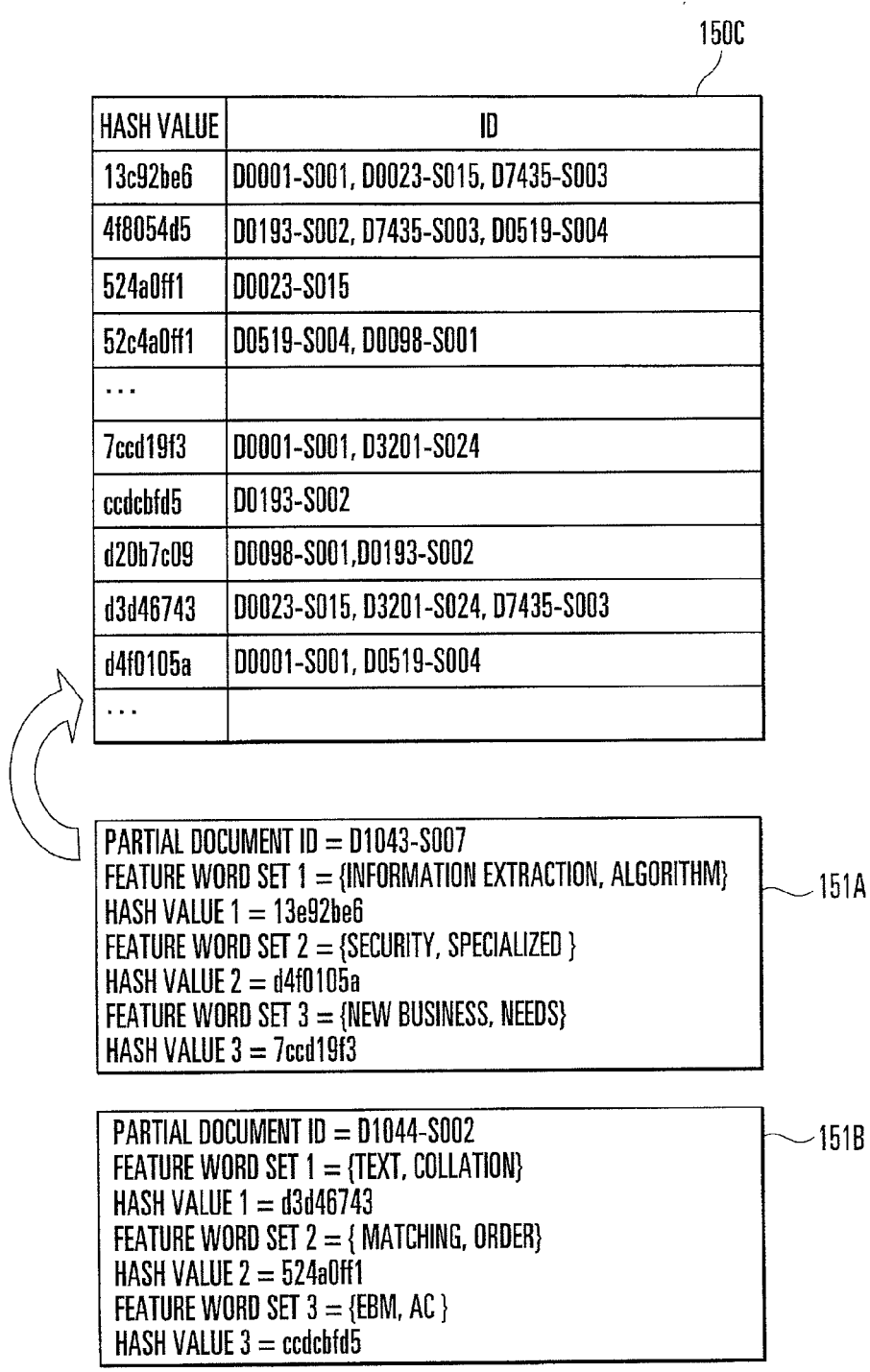
FIG. 12 is an explanatory view exemplifying registration of the stable character string index.

Assume also that the stable character string index 150 is now in the state of a stable character string index 150C shown in FIG. 12. FIG. 12 is an explanatory view exemplifying registration of the stable character string index 150. A hash value shown in FIG. 12 is obtained by a hypothetical method different from that for the hash value described in the first example.

If the hash value calculated in step S1414 already exists in the stable character string index 150C, the hash value calculation unit 140 additionally writes an ID in the ID field of this hash value. In the example shown in FIG. 12, the hash value "13c92be6" exists in the stable character string index 150C, so the hash value calculation unit 140 additionally writes an ID in the ID field of this hash value. If the calculated hash value does not exist in the stable character string index 150C, the hash value calculation unit 140 newly adds a record and additionally writes an ID in its ID field (step S1415).

In ID registration, the hash value calculation unit 140 checks whether hash values clash (step S1416). In the example shown in FIG. 12, hash values clash (YES), so the hash value calculation unit 140 shifts to step S1417. If hash values do not clash (NO), the hash value calculation unit 140 shifts to step S1418. In step S1417, the hash value calculation unit 140 records an ID with an identical hash value. The recording destination may be the memory of a computer or a database in a recording medium such as a hard disk.

This will be explained using the example shown in FIG. 12. Assume that the stable character string index 150 is in the state of the stable character string index 150C shown in FIG. 12. Also assume that the hash value calculation unit 140 is processing a partial document having an ID "D1043-S007". The stable object specifying unit 120 specifies three stable objects, and the feature word extraction unit 130 extracts two feature words for each stable object. This state is a state 151A shown in FIG. 12. The feature word set of the first stable object is {information extraction, algorithm} (in Japanese, {情報抽出, アルゴリズム}), that of the second stable object is {security, specialized} (in Japanese, {セキュリティ, 特化}), and that of the third stable object is {new business, needs} (in Japanese, {新規事業, ニーズ}). Hash values calculated using character strings obtained by concatenating the respective feature word sets are 13c92be6, d4f0105a, and 7 ccd19f3.

For the first hash value "13c92be6", three IDs clash in the stable character string index 150C shown in FIG. 12. That is, "D0001-S001", "D0023-S015", and "D7435-S003" clash. In step S1417, it suffices to record IDs so that it is clear these three IDs clash for the first stable object.

IDs which clash with the remaining stable objects are as follows. For the second hash value "d4f0105a", two IDs "D0001-S001" and "D0519-S004" clash. For the third hash value "7 ccd19f3", two IDs "D0001-S001" and "D3201-

S024" clash. The hash value calculation unit 140 executes this loop processing by the number of stable objects, and then shifts to step S1419.

In step S1419, the hash value calculation unit 140 counts the number of times each ID is repetitively recorded. In the example shown in FIG. 12, the repetitive count of each ID is three for D0001-S001, and one for D0023-S015, D0519-S004, D3201-S024, and D7435-S003. In the example of a state 151B shown in FIG. 12, the repetitive count of each ID is two for D0023-S015, and one for D0193-S002, D3201-S024, and D7435-S003.

Finally, the hash value calculation unit 140 determines that partial documents having clashing IDs equal to or larger in number than a separately designated number (m) are equivalent (step S1420).

The case of the state 151A for m=3 (i.e., m=n) will be exemplified. D1043-S007 is registered together with D0001-S001 for three hash values "13c92be6", "d4f0105a", and "7 ccd19f3". That is, D1043-S007 and D0001-S001 are registered together for three hash values. Thus, the hash value calculation unit 140 determines that a document indicated by D1043-S007 and that indicated by D0001-S001 are equivalent.

The case of the state 151B for m=2 (i.e., m<n) will be exemplified. D1044-S002 is registered together with D0023-S015 for two hash values "d3d46743" and "524a0ff1". That is, D1044-S002 and D003-S015 are registered together for two hash values. Thus, the hash value calculation unit 140 determines that a document indicated by D1044-S002 and that indicated by D003-S015 are equivalent.

For example, for m=3 which is equal to the number of stable objects (m=n), only partial documents having the same hash values for all stable objects are determined to be equivalent. This sounds almost the same as the first example. In practice, however, equivalence is determined more strictly in the second example. In the first example, whether partial documents are equivalent is determined based on one hash value obtained by concatenating all feature words. To the contrary, in the second example, the hash value is checked for clash for each stable object. The same hash value is sometimes generated even from different keys owing to its nature. In the first example, partial documents which are originally not equivalent may be determined to be equivalent. However, such an error hardly occurs for m=n in the second example.

In contrast, for m<n, equivalence is determined more flexibly than in the first example. The m value suffices to be appropriately decided in accordance with the type of equivalent document to be detected. The method of recording, in the document DB 900, that partial documents are equivalent is the same as that in the first example, and a description thereof will not be repeated.

Second Exemplary Embodiment

Figure 13:
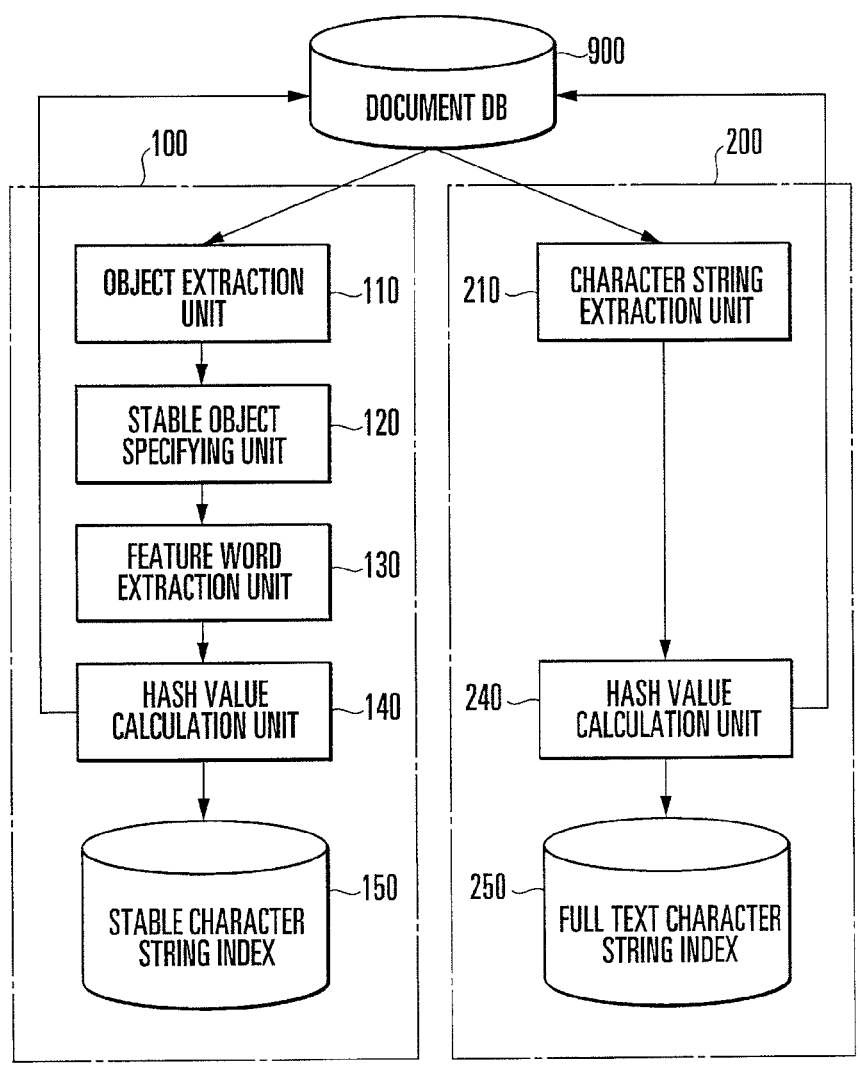
FIG. 13 is a block diagram exemplifying the configuration of an equivalence determination system according to the second exemplary embodiment.

The second exemplary embodiment will be described with reference to the accompanying drawings. FIG. 13 is a block diagram exemplifying the configuration of an equivalence determination system according to the second exemplary embodiment. Referring to FIG. 13, in the second exemplary embodiment of the present invention, an equivalence determination system 200 is added to the first exemplary embodiment. The equivalence determination system 200 includes a character string extraction unit 210, full text hash value calculation unit 240, and full text character string index 250.

The character string extraction unit 210 extracts character strings from all objects which form an electronic document in a document DB 900.

The hash value calculation unit 240 calculates a hash value from all character strings extracted by the character string extraction unit 210.

The full text character string index 250 stores an index in which a pair of a hash value and electronic document is registered Note that the equivalence determination system 200 is implemented as, e.g., a computer program, and the full text character string index 250 is implemented by, e.g., a storage device. The remaining arrangement is the same as that in the first exemplary embodiment. The program which implements the equivalence determination system 200 can be provided via a telecommunication line such as the Internet or provided by storing it in a machine readable recording medium such as an optical disk or magnetic disk.

The operation in the second exemplary embodiment of the present invention will be explained with reference to FIG. 13. A description of the same part as that in the first exemplary embodiment will not be repeated. The type of electronic document and the unit of a partial document also comply with the same example as that in the first exemplary embodiment.

The equivalence determination system 200 extracts electronic documents or partial documents accumulated in the document DB 900 one by one, and processes them. In the second exemplary embodiment, the same electronic document or partial document as that in the equivalence determination system 100 is processed at the same timing, but the same document need not always be processed at the same timing.

The equivalence determination system 200 extracts electronic documents or partial documents accumulated in the document DB 900 one by one, and processes them. Processing for a partial document will be explained. The order of extraction is the same as that in the equivalence determination system 100, and a description thereof will not be repeated.

The character string extraction unit 210 extracts character strings from all objects contained in a slide. At this time, all character strings may be extracted. However, the character string extraction unit 210 need not extract decoration information of a character string and the like.

The hash value calculation unit 240 concatenates character strings extracted by the character string extraction unit 210, and calculates the hash value of the concatenated character string. Using the calculated hash value, the hash value calculation unit 240 registers the slide ID in the full text character string index 250. If another slide has already been registered for the hash value of the slide to be registered, the hash value calculation unit 240 registers the slide ID of the slide during processing and that of the registered slide in the record of the other slide in the document DB 900.

Figure 14:
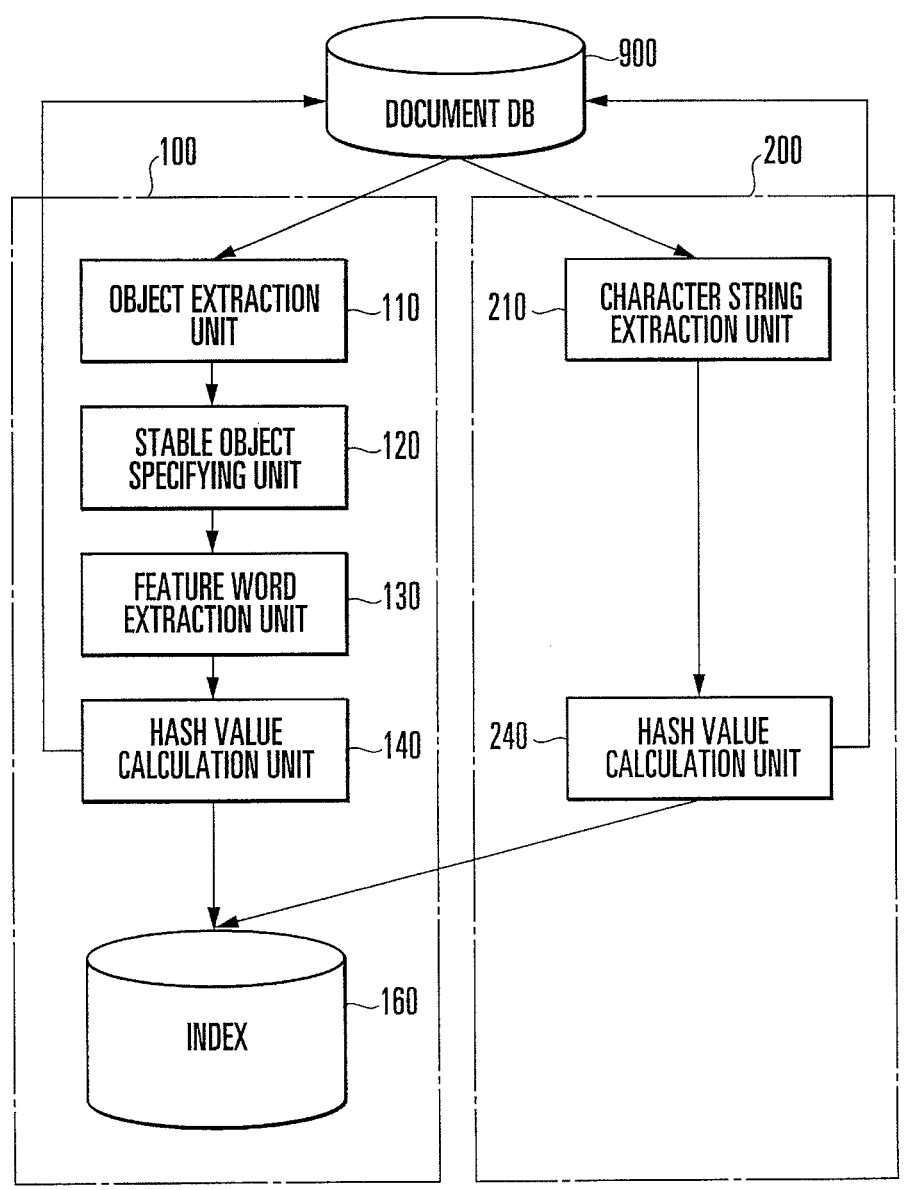
FIG. 14 is a block diagram exemplifying the configuration of an equivalence determination system when one index is used.

In the second exemplary embodiment, the full text character string index 250 and a stable character string index 150 are different indices, but may be combined into one index. FIG. 14 is a block diagram exemplifying the configuration of an equivalence determination system when one index is used. In this case, an identifier is added to an ID registered in the equivalence determination system 100 or that registered in the equivalence determination system 200 so as to discriminate the IDs from each other. For example, the equivalence determination system 100 directly uses an original ID as an ID to be registered. The equivalence determination system 200 adds an identifier such as "A" to the end of an original ID as an ID to be registered. The identifier enables discriminating IDs registered by the respective equivalence determination systems.

In registration in the document DB 900, an ID may be registered in the same field as that in the equivalence determination system 100, or a different field. When the ID is registered in the same field, the same ID may be registered twice by the equivalence determination systems 100 and 200. This means that a collision between hash values of the full text and that between hash values of the feature words of stable objects has occurred, and it is highly probable that electronic documents are equivalent or partially equivalent. If IDs are registered in different fields, this also applies as long as the same ID is registered in the respective fields. After the equivalence determination system 200 processes all partial documents, the processing ends.

In the second exemplary embodiment, the hash value calculation unit 240 functions as a possibility determination means for determining, based on a collision between hash values calculated by it, that corresponding electronic documents are highly likely to be equivalent. Also, the hash value calculation unit 240 functions as a determination means for, when the hash value calculation unit 140 of the equivalence determination system 100 determines that corresponding electronic documents determined to be highly likely to be equivalent are equivalent, determining that the corresponding electronic documents are equivalent.

The effect of the second exemplary embodiment will be explained. According to the second exemplary embodiment, electronic documents whose contents completely match each other can be quickly specified in the document database. This is because a character string in an electronic document is registered as a hash value, and equivalent documents are specified based on clash of the hash value.

In the second exemplary embodiment, the character string extraction unit 210 extracts character strings from all objects which form an electronic document in the document DB 900. However, the character string extraction unit 210 may extract a character string from at least one rarely modified object specified by a stable object specifying unit 120.

The above exemplary embodiments have described an equivalence determination system having characteristic arrangements as in (1) to (7) below.

(1) An equivalence determination system includes a specifying means (implemented by, e.g., the stable object specifying unit 120) for specifying parts of respective electronic documents in a set of electronic documents that are rarely modified manually, and a determination means (implemented by, e.g., the hash value calculation unit 140) for determining whether the parts of the electronic documents that are specified by the specifying means match each other, and when determining that the parts match each other, specifying that the documents are a plurality of similar electronic documents.

(2) An equivalence determination system includes a hash value calculation means (implemented by, e.g., the hash value calculation unit 140) for calculating the hash values of the rarely modified parts specified by the specifying means, and the determination means determines, by using the hash values calculated by the hash value calculation means, whether the parts specified by the specifying means match each other. The equivalence determination system having this arrangement can quickly specify similar electronic documents based on the hash values.

(3) An equivalence determination system includes a feature word extraction means (implemented by, e.g., the feature word extraction unit 130) for extracting a feature character string from the rarely modified part specified by the specifying means, and the hash value calculation means calculates a hash value based on the feature character string extracted by the feature word extraction means. The equivalence determination system having this arrangement can quickly specify similar electronic documents based on the hash values of feature character strings.

(4) In the equivalence determination system, the hash value calculation means calculates a hash value for each feature character string extracted by the feature word extraction means, and when the hash value calculated by the hash value calculation means satisfies a predetermined criterion, the determination means determines that the parts specified by the specifying means match each other. The equivalence determination system having this arrangement can determine equivalence more strictly.

(5) In the equivalence determination system, the specifying means specifies, as a rarely modified part, a part at which objects indicating a text, a figure, and an equation exist densely in an electronic document. The equivalence determination system having this arrangement can use the density as an index indicating the improbability of modifying an object.

(6) In the equivalence determination system, the specifying means calculates the density of an object based on the area of the object, and the amount of character string and decoration information contained in the object. The equivalence determination system having this arrangement can calculate the density of an object based on the object area and the like.

(7) In the equivalence determination system, the specifying means calculates the density of an object by adding sum value of inverse proportion to each distance to peripheral objects to the density of the object. The equivalence determination system having this arrangement can calculate the density of an object in consideration of distances from peripheral objects.

The present invention has been described above with reference to the exemplary embodiments, but is not limited to the above-described exemplary embodiments. The arrangement and details of the invention can be variously modified within the scope of the invention, and these modifications will readily occur to those skilled in the art.

This application is based upon and claims the benefit of priority from Japanese Patent Application No. 2007-265499, filed on Oct. 11, 2007, the disclosure of which is incorporated herein in its entirety by reference.

Industrial Applicability

The present invention can build a high-precision search system which excludes redundant search results by detecting identical or very similar electronic documents among electronic documents present in an organization. Storage management in an organization can be achieved by compressing many electronic documents which are identical or very similar while leaving only one typical electronic document, and saving them in a backup tape or the like, thereby reducing the cost.

The invention claimed is:

1. An equivalence determination system comprising:
a processor;
an object extracting unit, executed on the processor, that extracts, from respective electronic documents in a set of electronic documents, at least one object which forms the electronic document and includes at least one of a text, a figure, and an equation;
a specifying unit that specifies predetermined number of objects in the respective electronic documents based on density calculated by referring to the extracted objects; and
a judging unit that judges that plural electronic documents are similar based on the specified objects,
wherein said specifying unit calculates the density of a given object, from among the objects, based on an area of the given object, and an amount of character string and decoration information contained in the given object, wherein said specifying unit calculates a weighted density of the given object by selecting objects having a first distance or smaller from the given object, and adding a (i) sum value of inverse proportion to each distance from the given object to the selected objects to (ii) the density of the object.

2. An equivalence determination system comprising:

a processor;

an object extracting unit, executed on the processor, that extracts, from respective electronic documents in a set of electronic documents, at least one object which forms the electronic document and includes at least one of a text, a figure, and an equation;

a specifying unit that specifies predetermined number of objects in the respective electronic documents based on density calculated by referring to the extracted objects;

a judging unit that judges that plural electronic documents are similar based on the specified objects;

a hash value calculation unit that calculates hash values of the objects specified by said specifying unit; and a feature word extraction unit that extracts a feature character string from the objects specified by said specifying unit, wherein said hash value calculation unit calculates a hash value based on the feature character string extracted by said feature word extraction unit, wherein said judging unit determines, by using the hash values calculated by said hash value calculation unit, whether the objects specified by said specifying unit match each other, wherein said specifying unit calculates, based on a density of the at least one object extracted by the object extracting unit, an improbability of modifying the at least one object, and specifies objects based on a calculation result, said feature word extraction unit extracts at least one feature word as the feature character string from the specified object by said specifying unit, said hash value calculation unit calculates a hash value of a character string obtained by concatenating feature words extracted by said feature word extraction unit, and registers identification information of corresponding electronic documents in a hash table, and said judging unit judges, based on a match between hash values, that the corresponding electronic documents are equivalent.

3. An equivalence determination system according to claim 2, wherein said object extraction unit extracts an object from each partial document which forms an electronic document.

4. An equivalence determination system according to claim 2, wherein said specifying unit calculates an improbability of modifying the object, based on the density of the object and a density of a peripheral object.

5. An equivalence determination system according to claim 2, further comprising a character string extraction unit that extracts a character string from at least one object specified by said specifying unit, wherein said hash value calculation unit calculates a hash value of the character string extracted by said character string extraction unit, and registers identification information of one of corresponding electronic documents and partial documents in the hash table.

6. An equivalence determination system according to claim 2, wherein said hash value calculation unit calculates a hash value for each feature word, and registers identification information of one of corresponding electronic documents and partial documents in the hash table, and said judging unit determines, based on a match between at least a predetermined number of hash values out of hash values of respective feature words that are calculated by said hash value calculation unit, that the corresponding electronic documents are equivalent.

7. An equivalence determination system according to claim 2, wherein said specifying unit calculates the density of a given object, from among the objects, based on an area of the given object, and an amount of character string and decoration information contained in the given object.

8. An equivalence determination system according to claim 2, wherein said specifying unit recalculates a density of an object in consideration of a density of a peripheral object.

9. An equivalence determination system according to claim 2, further comprising:

a character string extraction unit that extracts all character strings from one of an electronic document and a partial document;

a full text hash value calculation unit that calculates hash values of all the character strings extracted by said character string extraction unit, and registers identification information of corresponding electronic documents in a full text hash table; and a possibility determination unit that determines, based on a match between hash values, that the corresponding electronic documents are highly likely to be equivalent, wherein when the corresponding electronic documents determined by said possibility determination unit to be highly likely to be equivalent are determined to be equivalent, based on hash values calculated from objects specified by said specifying unit, said judging unit judges that the corresponding electronic documents are equivalent.

10. An equivalence determination system according to claim 9, wherein said hash value calculation unit registers identification information of an electronic document using a single hash table serving as a feature word hash table and a full text hash table.

* * * * *

UNITED STATES PATENT AND TRADEMARK OFFICE
CERTIFICATE OF CORRECTION

PATENT NO. : 8,977,949 B2
APPLICATION NO. : 12/682722
DATED : March 10, 2015
INVENTOR(S) : Katsushi Matsuda Page 1 of 1

It is certified that error appears in the above-identified patent and that said Letters Patent is hereby corrected as shown below:

In the specification,

Column 9, Line 2: delete "In" and insert -- li --.

Column 9, Line 62: before "is equal" insert -- i --.

Signed and Sealed this
Twenty-seventh Day of October, 2015

Michelle K. Lee
*Director of the United States Patent and Trademark Office*